United States Patent
Vorderwisch et al.

(10) Patent No.: US 12,000,420 B2
(45) Date of Patent: Jun. 4, 2024

(54) COUPLING CLAMP

(71) Applicant: BÖLLHOFF VERBINDUNGSTECHNIK GmbH, Bielefeld (DE)

(72) Inventors: Alexander Vorderwisch, Steinhagen (DE); Jasmin Fritzsch, Werther (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 1259 days.

(21) Appl. No.: 16/607,578

(22) PCT Filed: Jan. 31, 2018

(86) PCT No.: PCT/EP2018/052420
§ 371 (c)(1),
(2) Date: Oct. 23, 2019

(87) PCT Pub. No.: WO2018/197059
PCT Pub. Date: Nov. 1, 2018

(65) Prior Publication Data
US 2020/0149565 A1    May 14, 2020

(30) Foreign Application Priority Data
Apr. 24, 2017 (DE) .......................... 102017108713.3

(51) Int. Cl.
*F16B 2/24* (2006.01)
*F16B 5/06* (2006.01)

(52) U.S. Cl.
CPC .............. *F16B 2/243* (2013.01); *F16B 5/065* (2013.01)

(58) Field of Classification Search
CPC .. F16B 2/24; F16B 2/243; F16B 2/245; F16B 5/06; F16B 5/065; F16B 21/07; F16B 21/10
See application file for complete search history.

(56) References Cited

U.S. PATENT DOCUMENTS 4,505,006 A    3/1985   Andre
5,437,516 A *  8/1995   Sauerwein ............ F16B 21/075
                                                           411/509
(Continued)

FOREIGN PATENT DOCUMENTS

CN    1426872 A    7/2003
CN    1730952 A    2/2006
(Continued)

OTHER PUBLICATIONS

Written Opinion & International Search Report for PCT/EP2018/052420 dated Apr. 3, 2018, 15 pages.
(Continued)

*Primary Examiner* — Daniel J Wiley
(74) *Attorney, Agent, or Firm* — Reising Ethington P.C.

(57) ABSTRACT

A female coupling clamp which is adapted to hold a coupling head of a male coupling element in an automatic or self-latching manner and to fasten itself in a component opening in an automatic latching manner. For this, the coupling clamp is equipped with at least three resiliently formed strip-type coupling arms which are connected to each other on one side. The respective provided fastening ends of the coupling arms comprise a radially outwardly open receiving groove for an edge of a component opening. A ball head is held in a receiving space with the aid of a neck portion which is similar in shape to an inverted truncated pyramid.

13 Claims, 9 Drawing Sheets

(56) References Cited

U.S. PATENT DOCUMENTS

| | | | |
|---|---|---|---|
| 5,462,382 A | 10/1995 | Sauerwein et al. | |
| 5,466,091 A * | 11/1995 | Sauerwein | E03F 3/046 |
| | | | 405/36 |
| 5,468,096 A * | 11/1995 | Sauerwein | E03F 5/06 |
| | | | 405/36 |
| 5,580,204 A | 12/1996 | Hultman | |
| 5,722,124 A | 3/1998 | Wisniewski | |
| 6,280,116 B1 | 8/2001 | Szu | |
| 6,799,758 B2 | 10/2004 | Fries | |
| 7,226,233 B2 * | 6/2007 | SuBenbach | F16B 35/042 |
| | | | 403/143 |
| 7,536,755 B2 | 5/2009 | Nakajima et al. | |
| 9,068,585 B2 | 6/2015 | Kuehn | |
| 9,228,602 B2 | 1/2016 | Kelly et al. | |
| 9,976,587 B2 | 5/2018 | Heimann et al. | |
| 2008/0028577 A1 | 2/2008 | Soman et al. | |
| 2010/0196090 A1 | 8/2010 | DeJong et al. | |
| 2015/0167717 A1 | 6/2015 | Morris et al. | |
| 2016/0375840 A1 * | 12/2016 | Dickinson | F16B 5/065 |
| | | | 24/295 |
| 2017/0059060 A1 * | 3/2017 | Gallion | H02G 3/32 |

FOREIGN PATENT DOCUMENTS

| | | |
|---|---|---|
| CN | 2874103 Y | 2/2007 |
| CN | 101205943 A | 6/2008 |
| CN | 103016485 A | 4/2013 |
| CN | 104121264 A | 10/2014 |
| CN | 104712621 A | 6/2015 |
| CN | 106015310 A | 10/2016 |
| DE | 2230309 A1 | 1/1974 |
| DE | 19836108 A1 | 6/1999 |
| DE | 20315778 U1 | 12/2003 |
| DE | 102014104206 A1 | 10/2015 |
| EP | 0605792 A1 | 7/1994 |
| EP | 2226436 A1 | 9/2010 |
| EP | 2482402 B1 | 4/2016 |
| FR | 1402072 A | 6/1965 |
| FR | 2539206 A1 | 7/1984 |
| FR | 2918723 A1 | 1/2009 |
| TW | 422371 U | 2/2001 |
| WO | WO2009007644 A2 | 1/2009 |

OTHER PUBLICATIONS

CN Notice of Allowance for CN Application No. 201880027365.X dated Nov. 1, 2021 (8 pages).
English translation of the International Preliminary Report on Patentability for PCT/EP2018/052420 dated Oct. 29, 2019, 10 pages.
CN Office Action for CN Application No. 201880027365.X dated Sep. 30, 2020 (8 pages).
CN Office Action for CN Application No. 201880027365.X dated May 17, 2021 (13 pages).

* cited by examiner

COUPLING CLAMP

1. TECHNICAL FIELD

The present disclosure relates to a female coupling clamp, a connection between this female coupling clamp and a male coupling element, as well as a manufacturing method for this coupling clamp and a connection method therefor.

2. BACKGROUND

In the prior art, various plug-in couplings in combination with a ball head pin are known. A respective example is disclosed in DE 19 836 108 A1. The plug-in coupling is fastened in a component opening or in a housing adapted to it. This opens up different installation options that can be adapted to the respective application. It is, however, a disadvantage that the housing for the plug-in coupling is complex with regard to installation space and manufacturing. On the other hand, it is advantageous that the ball head pin can be inserted into the plug-in coupling regardless of its orientation, i.e. regardless of the rotational angle orientation between the plug-in coupling and the ball head pin. A further disadvantage is that this type of plug-in coupling provides only limited retention forces. The plug-in coupling consists of an elastomer in order to enable an advantageous connecting and releasing of the ball head. However, this elastomer also provides the retention forces of the coupling, a housing as well as a damping behavior for connected components, which overall require a compromise in the material configuration. Depending on the application, this leads to unintentional detachment of the ball head from the plug-in coupling.

The fastening clamps as described in DE 2 230 309 and EP 2 482 402 B1 provide solely metallic solutions. In addition, these fastening clamps alone provide a connection without the need to receive a coupling pin or the like. Since the fastening clamps consist of metal, they provide a connection of high stability and at the same time a resilient tolerance compensation. It could be disadvantageous that these fastening clamps are restricted to components of limited thickness. This is because these fastening clamps must each completely engage through an opening in the components to be connected to one another in order to be able to fasten these components to one another.

A similar at least two-stage connection clamp is also described in US 2008/0028577 A1. This connection clamp is inserted in an orientation-bound manner into two openings aligned with each other. With respect to both openings, different fastening stages can be adjusted with the aid of this connection clamp.

Two-piece coupling clamps are known from U.S. Pat. No. 5,722,124 and US 2010/0196090 A1. These consist of metal and, accordingly, provide high retention forces. Due to the chosen angular cross-sectional shape, the female coupling and the male connecting element fit into each other only in a certain rotational angle orientation. This increases the installation effort, but does not realize higher retention forces of the coupling.

DE 20 315 778 U1 combines a metallic spring clip with an elastomeric holder in a plug-in coupling with a ball head. The metallic spring clamp enables high retention forces for the ball head and an insertion in a free rotational angle orientation. The holder made of elastomer or plastic contributes to vibration damping. While the installation in a holder of the coupling is necessary, the combination of metal and elastomer in the manufacturing of the coupling also involves high manufacturing effort.

It is therefore the object of the present disclosure to provide a coupling which can be manufactured with little effort and which provides a high connection quality and reliable retention forces in spite of little installation effort.

3. SUMMARY

The above object is solved by a female coupling clamp, by a connection between the female coupling clamp and a male coupling element, by a manufacturing method for the female coupling clamp and by a connection method for this female coupling clamp. Further embodiments and developments are set forth in the following description, the accompanying drawings and the appending patent claims.

The female coupling clamp is adapted to hold a coupling head of a male coupling element in an automatically or self-latching manner and to fasten itself in a component opening in an automatically or self-latching manner. The female coupling clamp has the following features: at least three resiliently formed strip-type coupling arms, which are connected to each other on one side, each providing a fastening end of the coupling clamp and extending opposite to an insertion direction of the male coupling element into the coupling clamp, i.e. in the direction of the open end of the coupling clamp. The ends of the coupling arms which are connected to one another surround a receiving space in which the coupling head can be detachably latched and which is limited in the insertion direction by the connection between the coupling arms and opposite to the insertion direction by a neck portion which is similar in shape to an inverted truncated pyramid and which is formed by the strip-shaped coupling arms. The fastening ends each comprise a radially outwardly open receiving groove for an edge of a component opening, which is formed by radial support faces which are arranged opposite to one another, respectively, so that loads on the coupling clamp in or opposite to the insertion direction can be diverted into a component in a stabilizing manner.

The female coupling clamp is characterized by a simple construction made of a spring sheet or of an elastic plastic. The several coupling arms extending from a central point in a radial manner are shaped in such a way that they provide at the same time a receiving space for a coupling head of a male coupling element as well as the fastening of the coupling clamp in a component opening. Based on the material selection of the coupling clamp and the strip-type and elongated construction of the coupling arms, the female coupling clamp, from its own constructive design, generates sufficient fastening forces for the female coupling clamp itself in a component opening and for the coupling head of the male coupling element. Since the receiving space is defined and limited by the strip-type coupling arms, but does not define the shape of this receiving space as complementary to the coupling head of a male coupling element to be received, the female coupling clamp opens up the possibility of being able to receive differently shaped coupling heads of the male coupling element with the same retention force. This is also supported by the fact that the neck portion of the receiving space, which is similar in shape to an inverted truncated pyramid, provides sufficient and suitably oriented abutment faces, so that the received coupling head is supported circumferentially in a uniform manner. In addition, this shape of the neck portion, which is similar in shape to an inverted truncated pyramid, realizes that the coupling head may be pressed into the receiving space so that it can abut against the interconnected ends of the coupling arms. The retention forces of the coupling arms in the receiving space which act radially inwards and in the insertion direction are supported by the fastening ends of the coupling arms. This is because as soon as the fastening ends have latched to an edge of a component opening, the component opening itself limits a radially outwardly directed deflection possibility of the coupling arms. In this way, although a certain radially outwardly directed springing of the coupling arms is still possible, for example when inserting the male coupling element as well as for tolerance compensation when establishing a connection between two components, the spring forces or retention forces of the coupling arms which are directed opposite a radially outwardly directed deflection increase with an increasing radially outwardly directed deflection. On the one hand, this supports the reliable latching of the coupling head in the receiving space and, on the other hand, the reliability and the consistent hold of the fastening ends in the component opening.

In order to ensure a reliable hold of the coupling clamp on or at an edge of the component opening, radial support faces arranged opposite each other form a receiving groove. The radial support faces may be arranged inclined towards each other. In this way, the radial support faces create a clamping of the edge of the component opening which is arranged between them and is inserted into the receiving groove. In addition, the arrangement of the radial support faces inclined towards each other ensures that components of different thicknesses can be inserted into the receiving groove. Thus, the coupling clamp may be universally applicable. If the component thickness is known, it is also preferred to arrange the radial support faces parallel to each other.

According to a further embodiment, the interconnected ends of the coupling arms are displaced or arranged offset into the receiving space opposite to the insertion direction, so that the coupling arms are elongated.

As already mentioned above, the coupling arms are formed in a radial manner and converge or meet at a shared connection point. Since this connection is part of the receiving space, it preferably provides an abutment face for a coupling head inserted into the receiving space. In order to adapt the receiving space to a certain size of a coupling head to be received or in order to increase the retention forces of the coupling arms, the connection end of the coupling arms may be displaced into the receiving space opposite to an insertion direction of the coupling element. Accordingly, the coupling arms adjacent to the connection end are bent in a meander-type manner to ensure a displacement of the connection end into the receiving space. In this way, the fastening arms are elongated, which may have an advantageous effect on the radially inwardly directed resilient retention forces of the fastening arms in the receiving space.

According to a further embodiment, the receiving space defined by the coupling arms has an outer diameter and the radial support faces of the fastening ends can be displaced radially inwards elastically resiliently to such an extent that their remaining radial extension is within the outer diameter of the receiving space.

According to a further embodiment, the receiving space defined by the coupling arms has an outer diameter and the radial support faces of the fastening ends can be displaced radially inwards elastically resiliently up to a maximum extent that their remaining radial extension is greater than the outer diameter of the receiving space.

As can be concluded from the two alternative designs of the radial extension of the receiving space and the fastening ends shown above, the female coupling clamp can be inserted into a component opening of a component in a one-sided or a two-sided manner. This is because the matched outer diameter of the receiving space and the elastically resilient deflection possibility of the fastening ends radially inwards ensure on the one hand that the female coupling clamp is inserted with the receiving space first or ahead into the component opening without that the female coupling clamp can be put through the component opening. This is because the fastening ends, in particular the radial support faces facing away from the receiving space, have a sufficiently large radial extension, preferably larger than the diameter of the component opening, so that the coupling clamp cannot be put through the component opening. This is particularly important if the component provides a one-sided accessibility only. Thus, both the radial extension of the receiving space and the extension of the fastening ends are matched to the component opening.

In the same way, however, it may also be preferred that the radial extension of the radial support faces facing away from the receiving space ensures an insertion of the coupling clamp into a component opening opposite to the insertion direction of a coupling element into the receiving space as well. For this purpose, the fastening ends are deformed resiliently elastically radially inwards to such an extent that their radial or lateral extension is smaller than a diameter of the component opening. In this context, it is preferred to reduce the radial extension of the radial support faces, although the support face for the coupling clamp on the component is lost as a result. As soon as the fastening ends have been inserted sufficiently deep into the component opening, the relief causes them to spring radially outwards so that the edge of the component opening is received in the fastening groove of the individual fastening arms. The correspondingly arranged radial support faces ensure that, after this fastening, the coupling clamp cannot be pressed out of the component opening in the axial direction.

According to a further embodiment, the coupling arms transition from the neck portion into the fastening ends via inclined sections which extend in a straight or curved manner. As these inclined sections may be arranged at an acute angle to the longitudinal axis of the coupling clamp opposite to the insertion direction, they form a supporting insertion slope for the coupling head of the male coupling element. This is because during insertion of the male coupling element into the coupling clamp, the coupling head slides along these inclined sections and presses the fastening arms radially outwards. As soon as the male coupling head has overcome the neck portion, which is similar in shape to an inverted truncated pyramid, the fastening arms again spring radially inwards and abut at a shaft of the male coupling element, may be in a flat, selective or linear supporting manner.

According to a further embodiment of the female coupling clamp, the connected ends of the coupling arms form in the receiving space a flat abutment face or an axially outwardly arched abutment face or an axially inwardly arched abutment face or an abutment face with a receiving bore for a part of the coupling head.

Especially a non-flat abutment face within the receiving space supports an additional stabilization of the coupling head of the male coupling element. This is because both an arched abutment face as well as an abutment face with a receiving bore may ensure a radial locking of the coupling head of the male coupling element which may be received in the receiving space. Thereby the arched abutment face arches in the direction of the longitudinal axis of the coupling clamp either out of or into the receiving space. The extension and/or curvature and/or depth of the arched abutment face is preferably adapted to the shape of the head of the coupling pin. It may be preferred that the arched abutment face is formed complementary to the portion of the coupling head which engages with it. In this way, transverse forces and loads on the coupling clamp are induced better into the coupling clamp due to the compensation of tolerances between connected components and are compensated by the deformation of the coupling clamp.

In addition, the present disclosure comprises a connection between a female coupling clamp and a male coupling element wherein the coupling clamp is fastened in a component opening having an opening diameter, wherein the coupling clamp has the following features: at least three resiliently formed strip-type coupling arms, which are connected to one another on one side, each providing a fastening end of the coupling clamp and extending opposite to an insertion direction of the male coupling element into the coupling clamp. The interconnected coupling arms surround a receiving space in which the coupling head can be releasably latched, and the fastening ends each comprise a radially outwardly open receiving groove for an edge of the component opening which is formed by radial supporting faces arranged opposite one another, respectively. In the portion of the receiving space, the coupling clamp has a maximum outer diameter which is smaller than the opening diameter of the component opening or/and the radial support faces of the fastening ends facing away from the receiving space have a radial extension and can be resiliently elastically displaced radially inwards to such an extent that a total radial extension of the coupling clamp in the portion of the fastening ends is smaller than the opening diameter of the component opening.

As already described above, the female coupling clamp can be inserted into a component opening in a one-sided or two-sided manner. For this purpose, the outer diameter of the receiving space is dimensioned in dependence on the opening diameter of the component opening. If the male coupling element permits a respective outer diameter of the receiving space, the outer diameter of the receiving space is selected to be smaller than the opening diameter of the component opening. In this way, the coupling clamp can be easily inserted into the component opening so that the fastening ends can automatically latch to or at the edge of the component opening. In the case of this course of procedure, if the radial support faces extend in the radial direction beyond the outer diameter of the receiving space. This should also be the case when the fastening ends of the fastening arms are resiliently deformed radially inwards to their maximum. Because in this way it is ensured that the coupling clamp cannot be put through the component opening. In the same way, however, it may also be preferred that the fastening ends, in particular the radial support faces of the fastening ends, have a lower radial extension at maximum resilient deformation directed radially inwards than the component opening. For, even under these conditions, the fastening ends of the coupling arms automatically latch to or at the edge of the component opening. In addition, this configuration opens up the possibility that the coupling clamp can also be installed in the component opening opposite to the insertion direction.

According to a further embodiment of the connection, the coupling pin comprises a pin shaft with a shaft diameter in connection with the pin head. The radial support faces of the fastening ends, which are arranged opposite each other, are connected to each other via an axial web, which is arranged within the component opening and has a web thickness in the radial direction, wherein it applies: $0.8 \ D_O \leq D_{Schaft} + 2 \cdot d_{Steg} \leq D_O$.

As soon as the male coupling element has been inserted into the female coupling clamp, both the pin shaft of the male coupling element and the fastening ends of the coupling clamp are arranged within the component opening. The diameter of the component opening may be matched to the diameter of the pin shaft and the thickness of the fastening arms arranged within the component opening. This means that although the opening diameter of the component opening allows an insertion of the male coupling element, the female coupling clamp cannot be removed any longer from the component opening when the male coupling element is inserted. This is because the limited diameter of the component opening ensures that the fastening of the coupling clamp cannot be deflected radially inwards sufficiently to release the edge of the component opening from the fastening groove. Accordingly, due to its construction, the coupling clamp also provides a self-locking mechanism against detachment from the component opening as soon as the male coupling element is latched in the coupling clamp.

Furthermore, the pin head abuts within the receiving space at least at the connection of the at least three coupling arms and at a neck portion of the receiving space which is similar in shape to an inverted truncated pyramid. According to a further embodiment of the, the pin shaft transitions conically into the pin head and inclined sections of the coupling arms between the receiving space and the fastening end are adapted to the conical portion of the pin shaft. This adaptation in the shape of the pin shaft and the coupling clamp provides additional supporting abutment faces between the male and the female coupling element. This increases the stability and thus the lifespan or just the reliability of the established connection.

According to a further embodiment, the coupling clamp has a clamping spot below the receiving space, which engages the coupling pin with radially inwardly arranged clamping faces.

Furthermore, the present disclosure includes a manufacturing method for a female coupling clamp which comprises the following steps: providing a spring sheet, punching out a planar shape having a plurality of strips extending radially from a shared connection section or punching out a plurality of strips and connecting the strips in a connection section, bending the plurality of strips in such a manner that they define a receiving space and end in fastening ends which each comprise a radially outwardly open receiving groove between adjacent radial support faces.

The female coupling clamp is made of a spring sheet by means of punching. As soon as the interconnected fastening arms are punched out and thus extend radially from the shared connection point, these coupling arms are bent in such a manner that they define in their combination the receiving space and the individual fastening ends. The manufacturing method is therefore based on classic methods of sheet forming and is therefore effective in its implementation and requires little effort. In addition, an integral or one-piece coupling clamp may be manufactured in this way.

According to a different manufacturing route, strips of sheet or other material strips are manufactured in order to later fabricate the coupling arms from these. These strips of sheet or material strips, preferably made of plastic, each form a coupling arm or two coupling arms connected to each other in pairs. The coupling arms are then connected to each other in a shared connection point by joining. For this purpose, all feasible methods are available that can produce a loadable connection. Accordingly, the coupling clamp is formed in several parts. This preferred manufacturing route has the advantage that material is saved compared to the integral production of the coupling clamp.

In the same way, it may also be preferred to manufacture the female coupling clamp by injection molding from a plastic with advantageous elastic spring properties. Accordingly, an injection mold provides the above described shape features of the female coupling element.

The present disclosure also includes further manufacturing methods for the coupling clamp. According to a second manufacturing method, first a mold, in particular an injection mold with a cavity is provided, which defines a coupling clamp, in particular a coupling clamp according to the preferred embodiments described above. Subsequently, the cavity of the mold is filled with flowing or liquid plastic or flowing or liquid metal and the plastic or metal in the cavity of the mold is cured by cooling or a cross-linking reaction in the plastic. Finally, the coupling clamp is demolded from the cavity of the mold.

According to a further manufacturing route for a female coupling clamp, in a first step a plurality of blanks of a thermoplastic material are provided in a length and width corresponding to one coupling arm or to a pair of two coupling arms connected to each other. Thereafter, a mechanical-thermal forming of the individual blanks into coupling arms is carried out in a mold by supplying heat and connecting the coupling arms in a shared connection point by means of a joining procedure. After the plastic of the coupling clamp has been hardened or cured, the coupling clamp is demolded from the mold.

The present disclosure further includes a connection method for the female coupling clamp with a component which comprises a component opening. This connection method comprises the following steps: inserting the coupling clamp with the receiving space first or ahead into the component opening until the fastening ends latch to or at an edge of the component opening, or compressing the fastening ends in the radial direction to a radial extent smaller than a diameter of the component opening, and inserting the coupling clamp with the fastening ends first or ahead into the component opening and latching the fastening ends to or at the edge of the component opening.

4. BRIEF DESCRIPTION OF THE ACCOMPANYING DRAWINGS

Some embodiments of the present disclosure are explained in more detail with reference to the accompanying drawings. Showing in.

5. DETAILED DESCRIPTION

Figure 1:
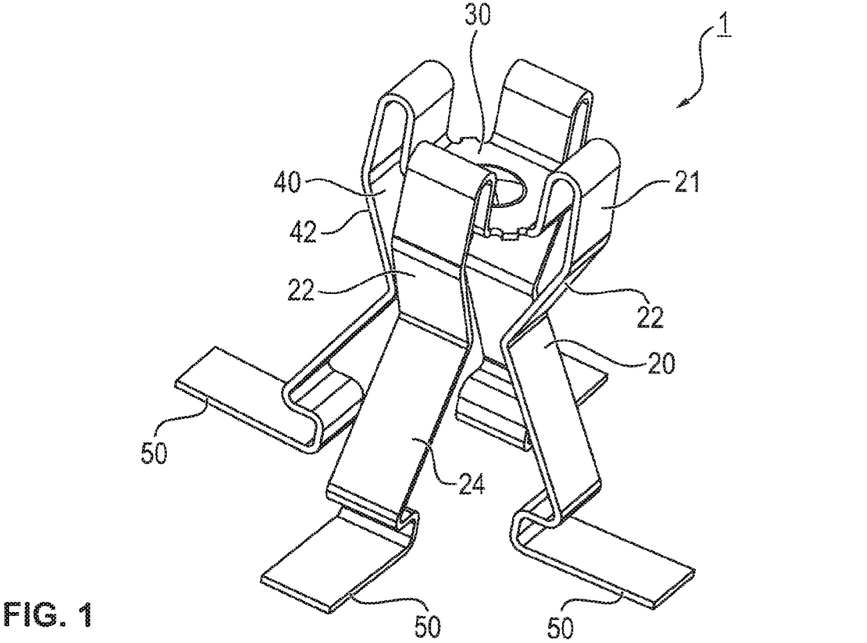
FIG. 1 a perspective view of an embodiment of the female coupling clamp.
Figure 2:
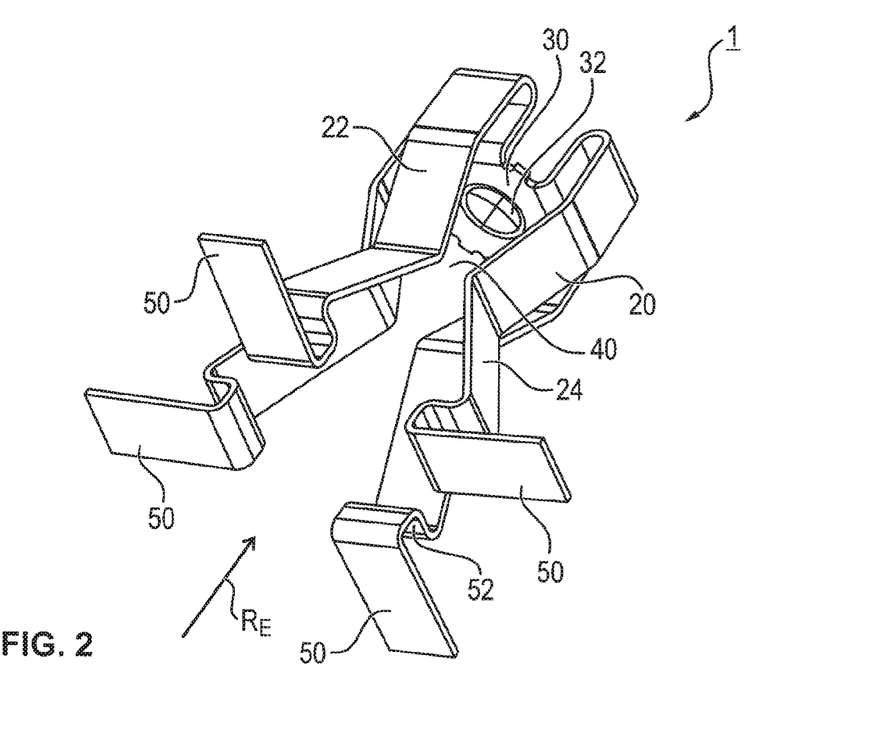
FIG. 2 another perspective view of an embodiment of the female coupling clamp.
Figure 3:
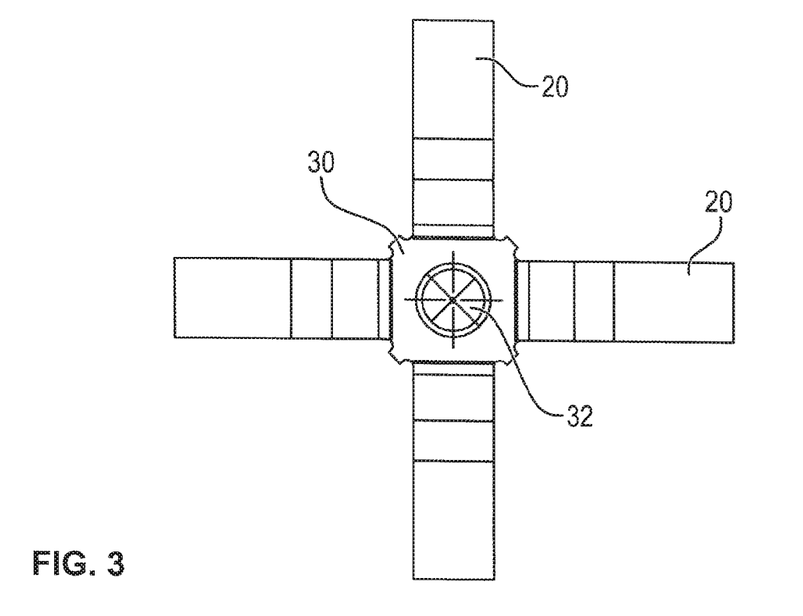
FIG. 3 a view from above on the coupling clamp according to FIG. 2.

FIG. 1 shows an embodiment of a female coupling clamp 1. This serves to receive and fasten a male coupling element 10, a ball pin 10 with ball head 12, pin shaft 16 and a neck portion 14 arranged therebetween. In this context, male coupling elements 10 are also possible, which are elongated and comprise a thickened head in comparison to the shaft and/or neck. Since the female coupling clamp 1 is fixed in an opening O of a component A and the ball pin 10 is connected to a second component B (not shown), components A and B can be reliably and easily connected via the female coupling clamp 1 and the ball pin 10.

According to a further embodiment, the female coupling clamp 1 consists of a metallic spring sheet (manufacturing step H1). A basic contour of the female coupling clamp 1 may be punched out (step H2) of the spring sheet in order to subsequently be bent (step H3) into the desired shape. Accordingly, the coupling clamp 1 is provided preferably integrally or as one piece. Since the thickness of the spring sheet is selectable, the elastic forces of the individual components of the female coupling clamp 1 can thereby be specifically adjusted. In addition, it may be preferred to adjust the elastic spring forces and properties of the female coupling clamp 1 by means of the type of metal used. In this context, besides providing the coupling clamp 1 made of metal, it may also be preferred to provide this coupling clamp 1 also with a plastic that can be realized in a similarly resilient manner. For this, the coupling clamp 1 is manufactured by injection molding.

The female coupling clamp 1 consists of at least three coupling arms 20. It may also be preferred to provide a larger number of coupling arms 20. In general, the coupling arms 20 are arranged in an evenly spaced manner about the longitudinal axis of the coupling clamp 1. According to a further embodiment, the coupling clamp 1 shown in FIGS. 1 to 8 has four coupling arms 20. After punching from a spring sheet, the coupling arms 20 may extend radially starting at a shared connection point 30 of the coupling arms 20. The connection point 30 defines an end of each coupling arm 20. In addition, the connection point 30 defines an inner abutment point 42 or also a head plate for the ball head 12 in a receiving space 40 of the female coupling clamp 1.

As an alternative to the integral forming of the coupling clamp 1, the coupling arms 20 are manufactured individually or in pairs. At the connection point 30, the coupling arms 20 are connected to each other by joining, i.e. riveting, clinching, welding, adhesive bonding. Thus, if the fastening arms 20 are manufactured individually or in pairs during the manufacturing of the coupling clamp 1, a step of joining the coupling arms 20 with each other is also provided.

The coupling arms 20 extend from the shared connection point 30 opposite to an insertion direction $R_E$ of the ball pin 10 into the female coupling clamp 1. By their course the coupling arms 20 define a receiving space 40 and, respectively, a fastening end 50 per coupling arm 20. The receiving space 40 receives the ball head 12 of the ball pin 10 as soon as it has been inserted into the coupling clamp 1 in the insertion direction $R_E$.

Figure 4:
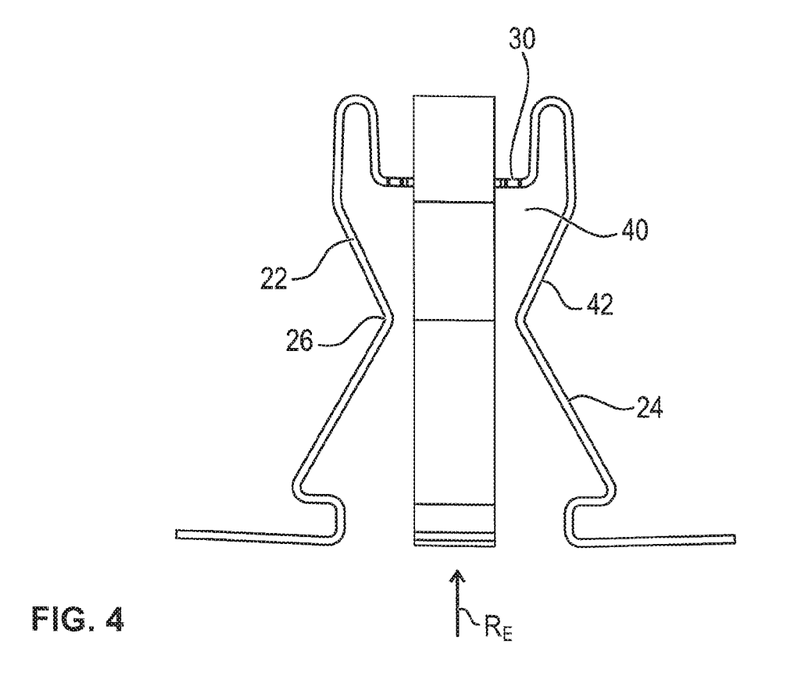
FIG. 4 a side view of the female coupling clamp according to FIG. 2.
Figure 5:
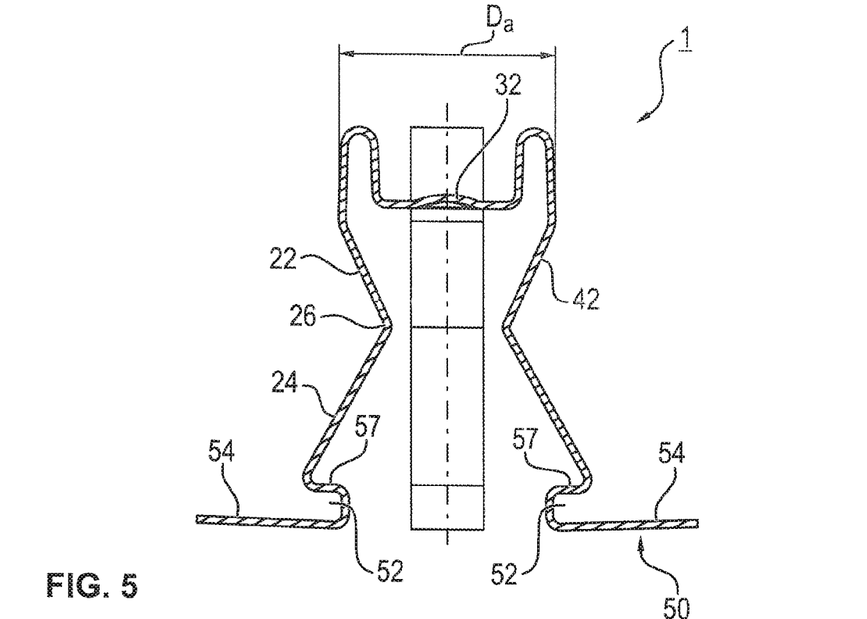
FIG. 5 the side view of FIG. 4 as partial sectional view.

The receiving space 40 is shown in a lateral view in FIGS. 4 and 5. At its upper end the receiving space 40, viewed in the insertion direction $R_E$, is limited by the connection point 30 of the plurality of coupling arms 20. As soon as a head of a male coupling element, here preferably the ball head 12 of the ball pin 10, has been inserted into the receiving space 40, it automatically latches in the receiving space 40. For this purpose, the regularly arranged coupling arms 20 at the lower end of the receiving space 40 form a neck portion 42 which is similar in shape to an inverted truncated pyramid.

The coupling arms 20 generate a radially inwardly directed spring force. This radially inwardly directed spring force in combination with the inclined sections 22 of the coupling arms 20 in the neck portion 42 press or push the ball head 12 against the connection point 30, which may also be referred to as head plate. Thus, the ball head 12 may be held without clearance between the abutment at the head plate or the connection point 30 and the neck portion 42, which is similar in shape to an inverted truncated pyramid, i.e. the abutment points at the inclined sections 22 of the coupling arms 20. Of course it is also possible to hold the ball head 12 without abutment at the head plate, but this provides for less stability.

To support the ball head 12 against the head plate or the connection point 30 in a stabilizing way, the head plate may provide an arch or curvature 32 in the insertion direction $R_E$, i.e. in the axial direction of the coupling clamp 1. This curvature is adapted to the diameter of the ball head 12 in order to achieve an optimal or ideal supporting effect. As an alternative to this, an opening is provided in the head plate. This opening (not shown) is so large that the opening edge rests at the ball head 12. The curvature 32 and the opening edge (not shown) stabilize and support the ball head 12 against lateral or transverse forces. In addition, they support the seating of the ball head 12 without clearance in the receiving space 40 according to the above described embodiments. This technical effect can preferably also be achieved by the fact that the curvature of the head plate is arched axially inwards, that is, into the receiving space 42. This curvature may engage in a matching recess in the face section of the coupling head or ball head 12 facing the curvature. In the same way, instead of the axially inward directed curvature, it may be preferred to provide a pin or projection. This then engages in an adapted recess of the coupling head irrespective of its shape.

Based on the fastening of the ball head 12 in the receiving space 40 preferably without clearance, a tolerance compensation between the components A and B is possible. This is because while the ball head 12 is held in the receiving space 40, the female coupling clamp 1 resiliently yields to forces in the direction of its longitudinal axis or transverse forces in the radial direction in order to compensate these forces and possible tolerances between the components A and B. It may also be possible to compensate an angular alignment between the longitudinal axis of the ball pin 10 and the longitudinal axis of the female coupling clamp 1 by means of the spring properties of the coupling clamp 1. In this context, the coupling clamp 1 is deformed resiliently according to the inclination of the ball pin 10. The elasticity of the coupling clamp 1 may also be supported by the inclined sections 24 of the coupling arms 20, which connect the receiving space 40 with the fastening ends 50.

By means of the mentioned sections 24 of the coupling arms 20, possible tolerances, installation errors and forces are transferred to the component A via the fastening ends 50. This is because, by means of the preferred firm hold of the ball head 12 in the receiving space 40, the coupling arms 20 yield to a mechanical load exerted by the ball head 12 and thus provide relief for the connection.

According to a further embodiment, the connection 30 or also the head plate is displaced into the receiving space 40 opposite to the insertion direction $R_E$. The respective hold of the head plate is ensured by meander-shaped portions 21 of the coupling arms 20, which form the transition between head plate and coupling arm (see FIG. 1). With this construction, the receiving space 40 can be adjusted to a certain size of a coupling head 12 to be received. Furthermore, the retention forces and spring properties of the coupling arms 20 are preferably adapted by means of the meander-shaped portions 21. This is because the meander-shaped portions elongate the coupling arms 20 and enable a selective elongation or shortening of the sections 24 and 26 and their leverage effect. Accordingly, the realizable radial forces of the coupling arms 20 can be configured for specific connections.

The sections 22 and 24 are connected by an angle pointing radially inwards. This forms one clamping point 26 per coupling arm 20, respectively, which engages the male coupling element 10 adjacent to the neck portion 16. In addition, the inclined sections 24 may be adapted to a conical portion of the pin shaft 16 to facilitate a reciprocal support.

Figure 6:
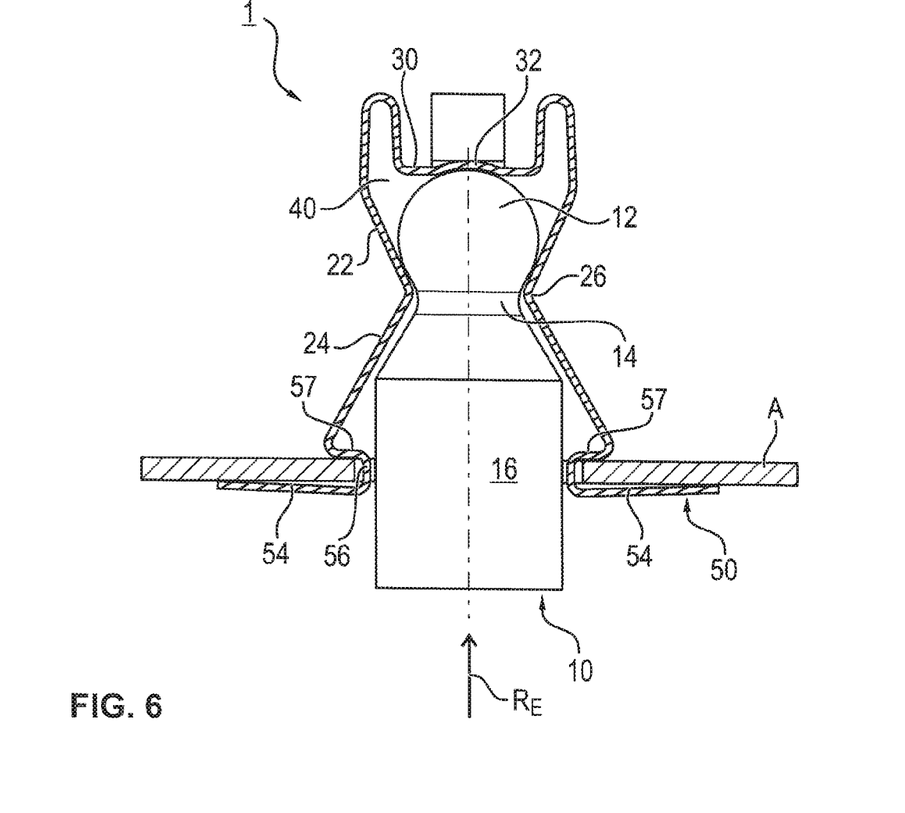
FIG. 6 an embodiment of a connection of a male coupling element and the female coupling clamp for connection to a component, FIG. 7 a partial sectional view of the connection of FIG. 6, FIG. 8 a further embodiment of the female coupling clamp, FIG. 9 an exploded view of a connection consisting of a female coupling clamp, a male coupling element and a component with component opening, FIG. 10 another perspective view of the elements of FIG. 9, FIG. 11 an embodiment of a connection of the two components A, B with the aid of the female coupling clamp and a male coupling element, FIGS. 12a, 12b and 12c various flow charts of embodiments of different manufacturing methods for the female coupling clamp, and FIGS. 13a and 13b two flow charts of embodiments of an installation method of the coupling clamp in a component opening.

As can be seen from FIG. 6, each fastening end 50 comprises a radially outwardly open receiving groove 52. If the female coupling clamp 1 is inserted into the component opening O, with the receiving space 42 first or ahead, the coupling arms 20 and thus also the fastening ends 50 are first resiliently deformed radially inwards. As soon as the edge of the component opening is aligned with the receiving groove 52, the coupling arms 20 spring radially outwards and the edge of the component opening O is received in the receiving groove 52.

The receiving groove 52 is limited by two radial support faces 54 arranged opposite each other. The radial support faces 54, 57 may be arranged inclined towards each other. In this way, the radial support faces 54, 57 produce a clamping of the edge of the component opening O which is arranged between them and inserted into the receiving groove 52. In addition, the arrangement of the radial support faces 54, 57 inclined towards each other ensures that components of different thicknesses can be inserted into the receiving groove 52. This allows the coupling clamp 1 to be preferably universally applicable. If the component thickness is known, it may also be preferred to arrange the radial support faces 54, 57 parallel to each other. In addition, the radial support faces 54 preferably divert mechanical loads of the coupling clamp 1 at the coupling arms 20 into the component A. The size of the radial support faces 54 can be adjusted depending on the type and strength of the load.

Figure 9:
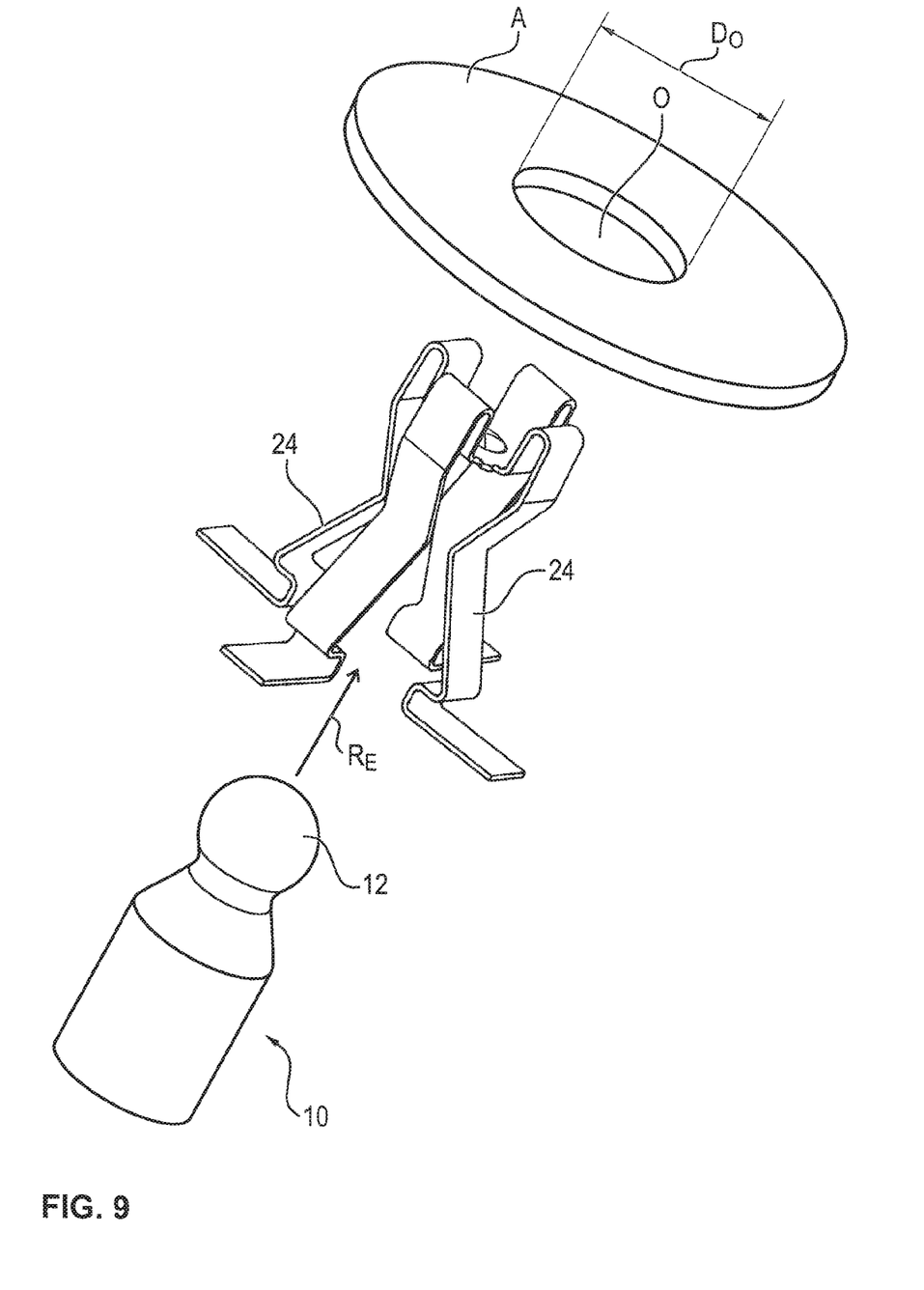

In addition, the size of the radial support faces 54, in particular their radial extension, is set in dependence on the installation of the coupling clamp 1 in the component opening O. According to the illustration in FIGS. 9 and 10, the coupling clamp 1 may be inserted or put into the component opening O in insertion direction $R_E$. For this purpose, the maximum outer diameter $D_a$ of the receiving space 40 is smaller than or equal to the diameter $D_O$ of the component opening O. Accordingly, the female coupling clamp 1 can be inserted or put into the component opening O with the receiving space 40 first or ahead.

Since the inclined sections 24 of the coupling arms 20 are inclined outwards, they extend radially outwards beyond the diameter $D_O$ of the component opening O. Therefore, when inserting the coupling clamp 1, they are pressed resiliently radially inwards by the edge of the component opening O, until the edge of the component opening O engages in the receiving groove 52 of the fastening ends 50, respectively, when the fastening ends 50 spring radially outwards. Since the fastening ends 50, in the unloaded state, may be arranged on an imaginary circle around the longitudinal axis of the coupling clamp 1, which has a larger diameter than the component opening O, the fastening ends abut firmly at the edge of the component opening O.

Figure 10:
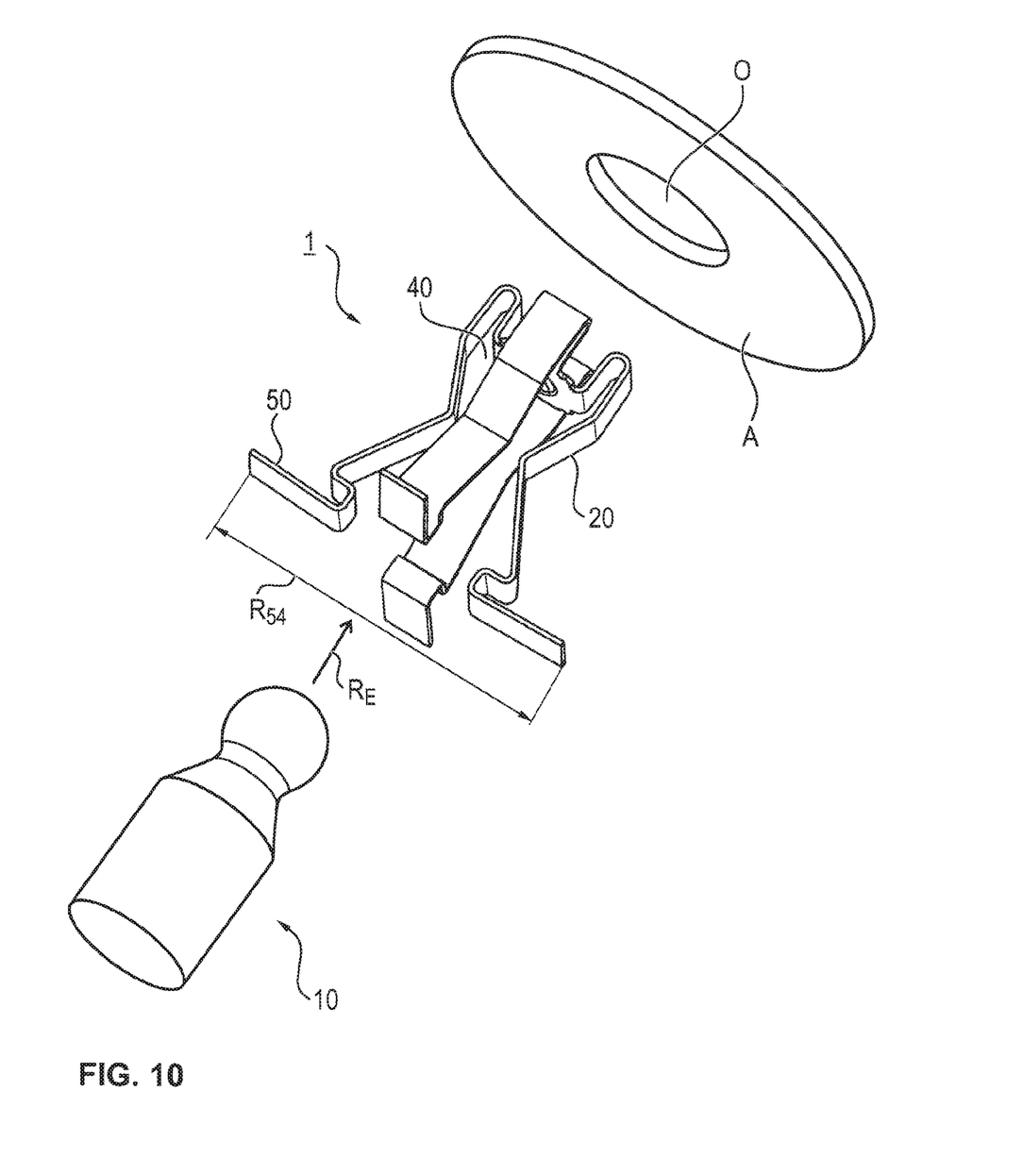

In order to ensure a secure hold of the coupling clamp 1 in the component opening O during the connecting, a minimal radial extension $R_{54}$ of the radial faces 54 is greater than the diameter of the component opening O (see FIG. 10). This ensures that the coupling clamp 1 cannot put through the component opening O, although the fastening ends 50 are radially compressed.

Nevertheless, it is also preferred to provide for the radial extension $R_{54}$ of the radial faces 54 to be smaller than the diameter of the component opening O. In this case it must be ensured that the coupling clamp 1 is not put through the component opening.

The latter radial extension $R_{54}$ of the radial face 54 also opens up the possibility to insert the female coupling clamp 1 into the component opening O opposite to the insertion direction $R_E$. In this case, the fastening ends 50 are radially compressed before the inserting so that their radial extension $R_{54}$ is smaller than the diameter of the component opening O. As soon as the receiving groove 52 is arranged opposite to the edge of the component opening O, the fastening ends 50 are relieved and the receiving groove 52 receives the edge of the component opening O, respectively.

Figure 7:
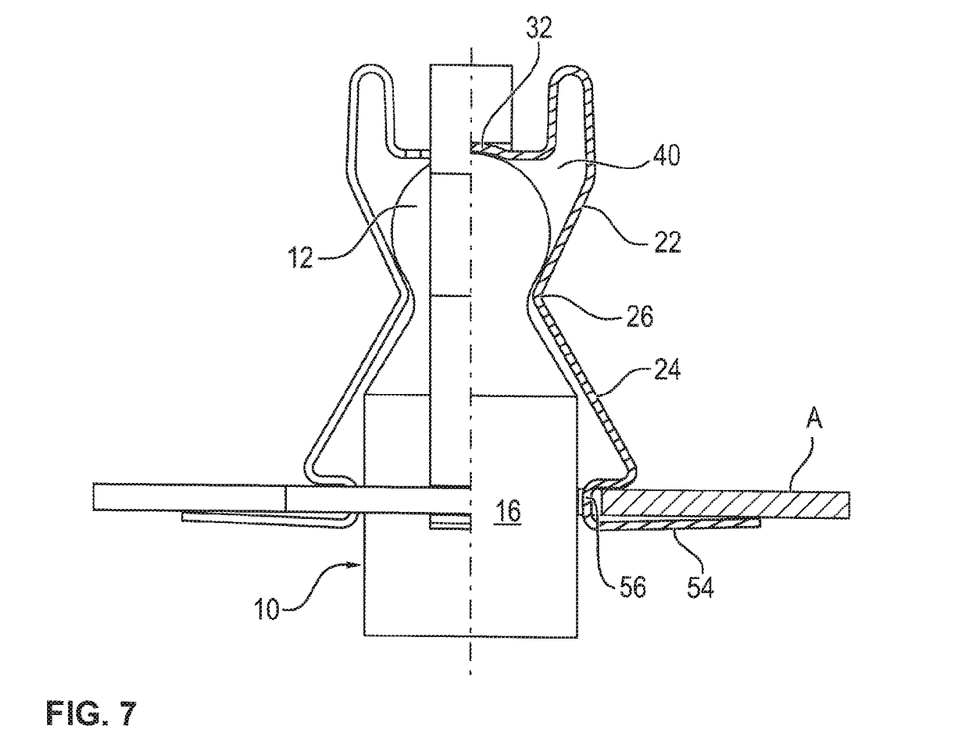

FIGS. 6 and 7 show a connection established according to the method described above. From the sectional view in FIG. 6 it can be seen that the pin shaft 16, together with the axial webs 56 of the fastening groove 52, almost completely fill the diameter $D_O$ of the component opening O. This ensures that the ball pin 10 secures the hold of the coupling clamp 1 in the component opening O and thus its own hold in the connection. This is because after installation of the ball pin 10 in the coupling clamp 1, the coupling clamp 1 can no longer be removed from the component opening O. For this purpose, the pin shaft 16 has a shaft thickness $D_{Schaft}$, for which the following preferably applies: $0.8 \cdot D_O \leq D_{Schaft} + 2 \cdot d_{Steg} \leq D_O$. In this context, $d_{Steg}$ refers to the radial thickness of the axial web 56 of the receiving groove 52. Due to the preferred dimensioning of the pin shaft 16, the thickness $d_{Steg}$ of the axial web 56 and the diameter of the component opening O, the space in the component opening O is not sufficiently large to displace the fastening ends 50 radially inwards to such an extent that the edge of the component opening O can be released from the receiving groove 52 of the fastening ends 50. Accordingly, the coupling clamp 1 with the coupling pin 10 inserted cannot be released from the component opening O. A release of the coupling clamp 1 from the component opening O is preferably also prevented by a radial length of the radial support faces 57 facing the receiving space 42 (see FIGS. 5, 6). If the radial length of the radial support face 57 together with the diameter $D_{Schaft}$ of the pin shaft 16 is greater than the diameter $D_O$ of the component opening O, the coupling clamp 1 with inserted coupling pin 10 cannot be released from the component opening O. Thus, the combination of ball pin 10 and coupling clamp 1 provides a self-locking connection between two components A, B.

Figure 8:
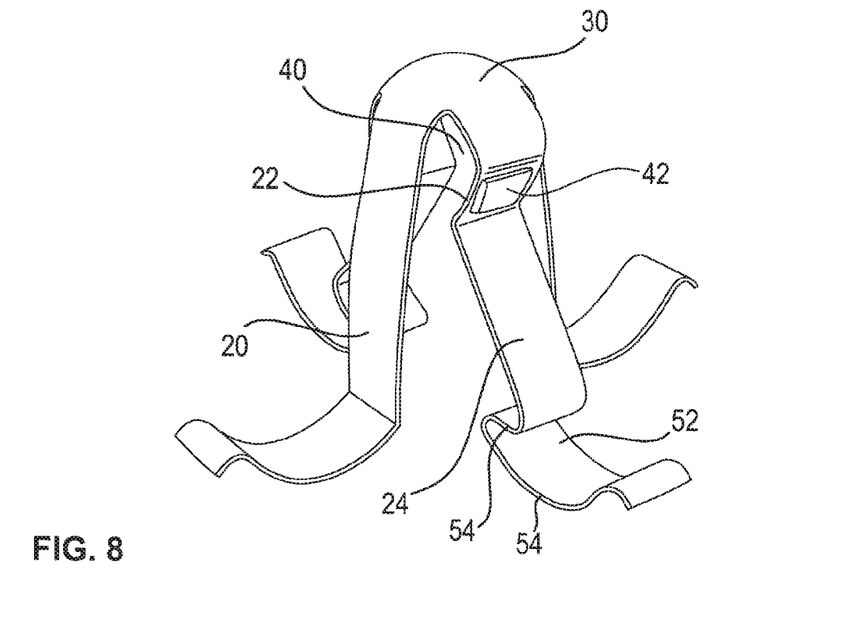

A further embodiment of the coupling clamp is shown in FIG. 8. The connection 30 of the coupling arms 20 may be formed as a ball socket to receive the ball head 12 of the ball pin 10. The coupling clamp 1 may have four uniformly spaced coupling arms 20. Two coupling arms 20 arranged opposite each other form the neck portion 42, which presses the ball head 12 into the receiving space 40, here the ball socket. The inclined sections 24 also support the insertion of the coupling clamp 1 into the component opening O. While the edge of the component opening O is received in the receiving groove 52, the radial faces 54 may be resting at the component (not shown). Due to the curvilinear shape of the radial faces 54, these do not abut the component flatly or areally. By this, preferably different component thicknesses are compensated, as it is also achieved by radial faces 54, 57 described above.

Figure 11:
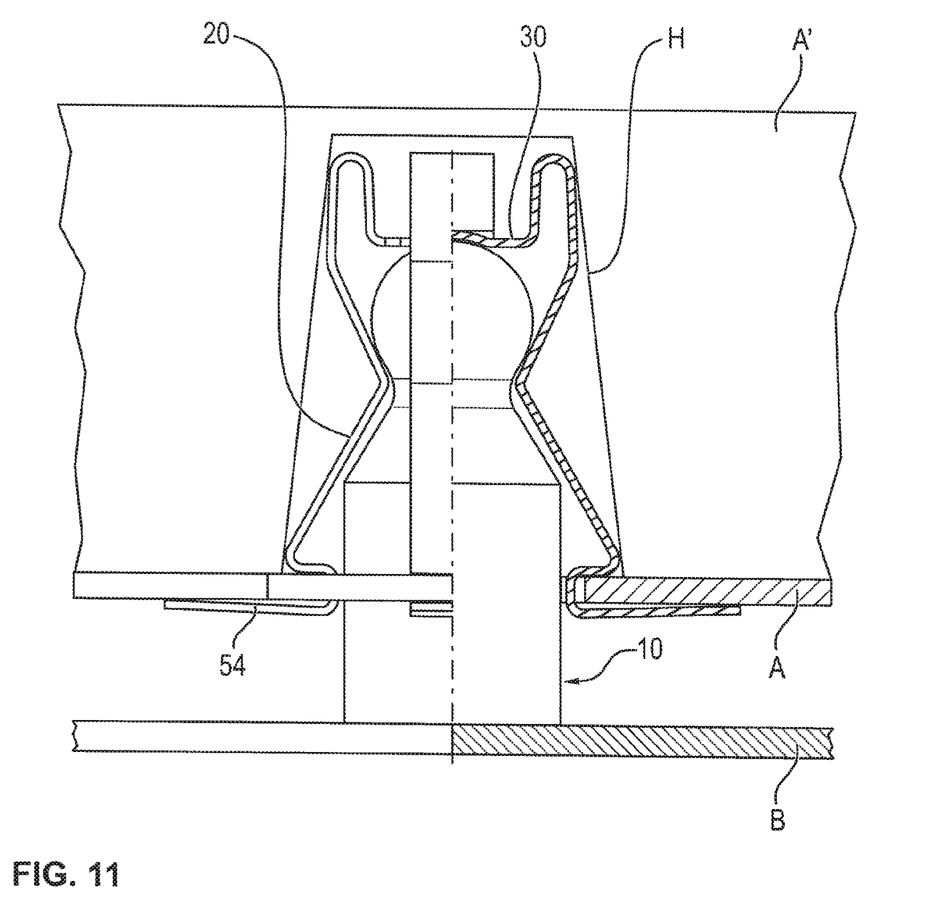

Referring to FIG. 11, the coupling clamp 1 is also suitable for installation in a sandwich panel A' with a stable top layer A. The top layer A corresponds to the component A with component opening O (see above). While the coupling clamp 1 according to the above described embodiments is fastened to the top layer A, the coupling clamp 1 is received within a foam layer A' or a layer of honeycomb material A'. For this purpose, a corresponding cavity H is provided in the material layer A' to receive the coupling clamp 1.

Figure 12A:
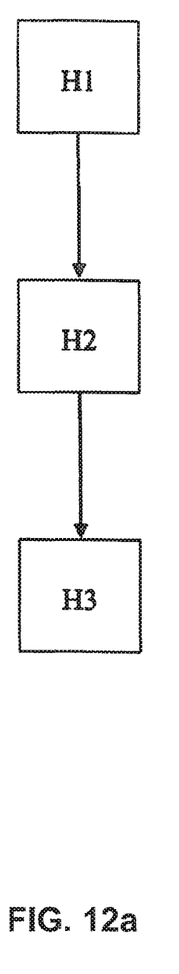

Referring to the flow chart in FIG. 12a, which shows a further embodiment of the manufacturing method for the female coupling clamp 1, the manufacturing steps can be summarized as follows: providing a spring sheet in step H1, punching out a flat shape having a plurality of strips 20 extending radially from a shared connection point 30 to later be coupling arms in step H2, and bending the plurality of strips 20 such that they define the receiving space 40 and end in fastening ends 50, which each comprise a radially outwardly open receiving groove 52 between adjacent radial support faces 54 (step H3).

Figure 12B:
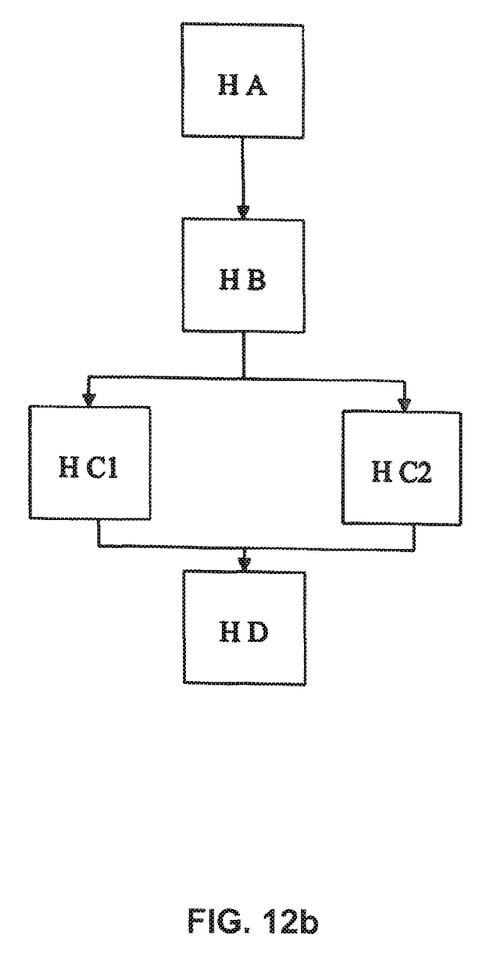

The present disclosure also includes a further manufacturing method for the coupling clamp 1, which is explained using the flow chart in FIG. 12b. FIG. 12b shows a further embodiment of the manufacturing method, which can be supplemented by further steps. According to a second manufacturing method, first a mold, in particular an injection mold, having a cavity is provided (step HA), which defines a coupling clamp 1, in particular a coupling clamp 1 according to the embodiments described above. Subsequently, the cavity of the mold is filled with liquid or flowing plastic or liquid or flowing metal (step HB) and the plastic or metal in the cavity of the mold is cured or hardened by cooling (step HC1) or a cross-linking reaction in the plastic (step HC2). Finally, the coupling clamp is demolded from the cavity of the mold (step HD).

Figure 12C:
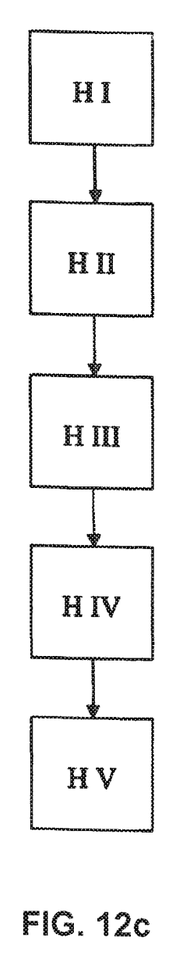

According to a further manufacturing route for a female coupling clamp 1 (FIG. 12c), a plurality of blanks of a thermoplastic material in a length and width corresponding to a coupling arm or a pair of two interconnected coupling arms is provided in a first step HI. Then a mechanical-thermal forming (step HII) of the individual blanks into coupling arms takes place in a mold by supply of heat and a joining (step HIII) of the coupling arms 20 in a shared connection point 30 by a joining process takes place. The joining process preferably comprises a thermal joining or an adhesive bonding. After the plastic of the coupling clamp 1 has cured or hardened (step HIV), the coupling clamp 1 is demolded from the mold (step HV).

Figure 13A:
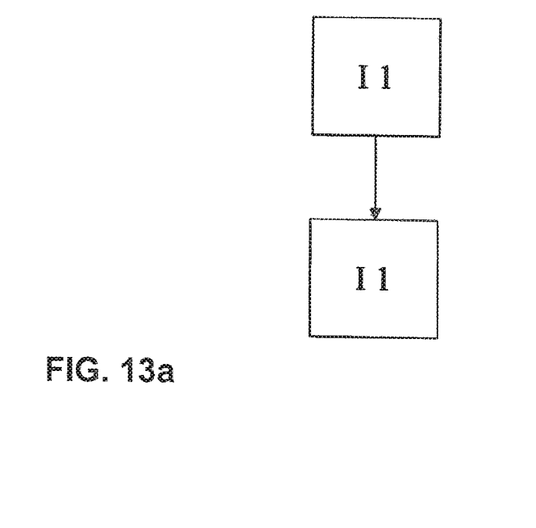
Figure 13B:
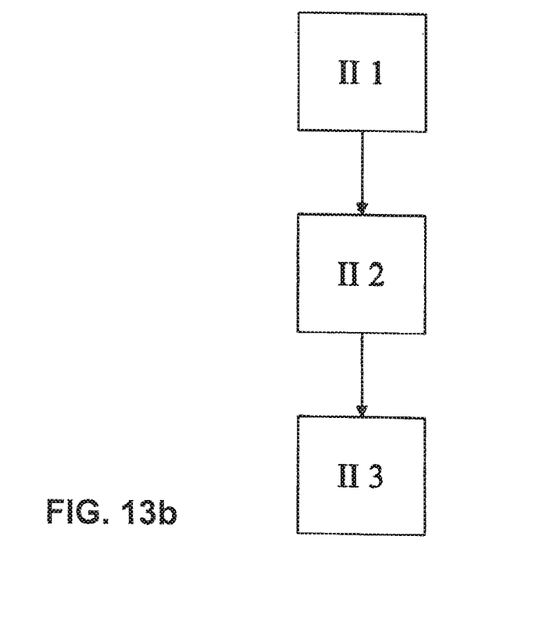

In FIG. 13, two alternatively preferred connection methods of the female coupling clamp with component A having component opening O are summarized in the form of flow charts. According to a first embodiment, first the female coupling clamp 1 is put into the component opening O with the receiving space 40 ahead (I1), until the fastening ends 50 latch at an edge of the component opening O (I2).

Alternatively to this, it may also be preferred that the fastening ends 50 at first are compressed in radial direction (II1). The fastening ends 50 may be compressed to a radial extension smaller than the diameter of the component opening O. In the following step 112, the coupling clamp 1 is inserted into the component opening O with the fastening ends 50 first or ahead. The fastening ends 50 latch at the edge of the component opening O as soon as the receiving groove 52 is arranged opposite the edge of the component opening O and the fastening ends 50 are also relieved radially (113).

The invention claimed is:

1. A female coupling clamp which is adapted to hold a coupling head of a male coupling element in an automatically latching manner and to fasten itself in a component opening in an automatically latching manner, wherein the coupling clamp comprises the following features:
   a. at least three resiliently formed strip-type coupling arms, which are connected to each other on one side, each providing a fastening end of the coupling clamp and extending opposite to an insertion direction of the male coupling element into the coupling clamp,
   b. the interconnected ends of the coupling arms surround a receiving space in which the coupling head can be releasably latched and which is limited in the insertion direction by the connection between the coupling arms and opposite to the insertion direction by a neck portion which is similar in shape to an inverted truncated pyramid and which is formed by the strip-shaped coupling arms,
   c. the fastening ends each comprise a radially outwardly open receiving groove for an edge of a component opening which is formed by radial supporting faces arranged opposite one another, respectively, so that loads of the coupling clamp in the insertion direction can be diverted in a stabilizing manner into a component, wherein
   d. the interconnected ends of the coupling arms are displaced into the receiving space opposite to the insertion direction, so that the coupling arms are elongated.

2. The coupling clamp according to claim 1, in which the receiving space defined by the coupling arms has an outer diameter and the radial support faces of the fastening ends can be displaced radially inwards in an elastic resilient manner to such an extent that their remaining radial extension is within the outer diameter of the receiving space.

3. The coupling clamp according to claim 1, in which the receiving space defined by the coupling arms has an outer diameter and the radial support faces of the fastening ends can be displaced radially inwards in an elastic resilient manner at most to such an extent that their remaining radial extension is greater than the outer diameter of the receiving space.

4. The coupling clamp according to claim 1, in which the coupling arms transition from the neck portion to the fastening ends via inclined sections which extend in a straight or curved manner.

5. The coupling clamp according to claim 1, in which the connected ends of the coupling arms in the receiving space form a flat abutment face or an axially outwardly arched abutment face or an axially inwardly arched abutment face or an abutment face with a receiving bore for a part of the coupling head.

6. A connection between a female coupling clamp according to claim 1 and a male coupling element in which the coupling clamp is fastened in a component opening having an opening diameter Do, wherein the coupling clamp comprises the following features:
   a. at least three resiliently formed strip-type coupling arms, which are connected with each other on one side, each providing a fastening end of the coupling clamp and extending opposite to an insertion direction of the male coupling element into the coupling clamp,
   b. the interconnected coupling arms surround a receiving space in which the coupling head can be releasably latched, and
   c. the fastening ends each comprise a radially outwardly open receiving groove for an edge of the component opening, which receiving groove is formed by radial support faces arranged opposite one another, respectively, wherein
   d. the coupling clamp has, in the portion of the receiving space, a maximum outer diameter which is smaller than the opening diameter Do of the component opening or/and
   e. the radial support faces of the fastening ends facing away from the receiving space have a radial extension and can be displaced radially inwards in an elastic resilient manner to such an extent that a total radial extension of the coupling clamp in the portion of the fastening ends is smaller than the opening diameter Do of the component opening.

7. A connection according to claim 6, in which the coupling element comprises a pin shaft with a shaft diameter in connection with the pin head and the radial support faces of the fastening ends, which are arranged opposite each other, are connected via an axial web, which is arranged within the component opening and has a web thickness $d_{Steg}$ in the radial direction, wherein it applies: $0.8\ D_O \leq D_{Schaft} + 2 \cdot d_{Steg} \leq D_O$.

8. A connection according to claim 6, in which the pin head abuts within the receiving space at least at the connection of the at least three coupling arms and at a neck portion of the receiving space which is similar in shape to an inverted truncated pyramid.

9. A connection according to claim 6, in which the pin shaft transitions conically into the pin head and inclined portions of the coupling arms between the receiving space and the fastening end are adapted to the conical portion of the pin shaft.

10. A connection according to claim 6, in which the coupling clamp has a clamping spot below the receiving space, which engages with radially inwardly arranged clamping faces adjacent to a neck portion of the coupling pin.

11. Manufacturing method for a female coupling clamp according to claim 1, comprising the following steps:
   a. providing a spring sheet (H1),
   b. punching out a flat shape having a plurality of strips extending radially from a shared connection section (H2) or punching out a plurality of strips and connecting the strips in a connection section,
   c. bending the plurality of strips such that they define a receiving space and end in fastening ends each of which comprises a radially outwardly open receiving groove between adjacent radial support faces (H3).

12. A manufacturing method according to claim 11, in which the coupling clamp is manufactured integrally or in several parts.

13. A manufacturing method according to claim 11, with the further step:

partially overmolding individual portions of the coupling arms with a plastic.

* * * * *